March 4, 1952  P. LEBENBAUM, JR., ET AL  2,588,320
DYNAMOELECTRIC APPARATUS
Filed March 14, 1951
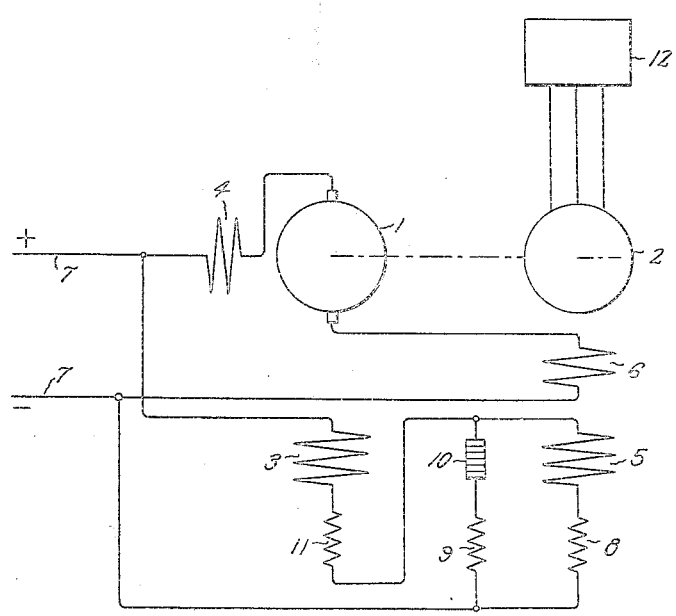
Inventors:
Paul Lebenbaum Jr.
Alec Fisher,
by Ernest H. Britton
Their Attorney.

Patented Mar. 4, 1952

2,588,320

UNITED STATES PATENT OFFICE 2,588,320

DYNAMOELECTRIC APPARATUS

Paul Lebenbaum, Jr., and Alec Fisher, Lynn, Mass., assignors to General Electric Company, a corporation of New York Application March 14, 1951, Serial No. 215,516

3 Claims. (Cl. 322—16)

This invention relates to dynamoelectric apparatus and, more particularly, to dynamoelectric apparatus for converting direct current to alternating current.

Many applications exist for which apparatus is needed to convert electrical energy from variable-voltage direct current to alternating current having constant voltage and frequency. For example, in railway cars where the only power supply available is a bank of storage batteries charged by an axle-driven direct current generator, fluorescent lamps and alternating current motors for driving refrigeration compressors and other apparatus require a constant voltage and frequency alternating current. The conversion from direct current to alternating current is often made by a motor-generator set in which a direct current motor is direct-connected to drive an alternating current generator. Since the voltage of the axle-driven generator varies appreciably with the speed of the car, unless special regulating means are provided, the speed of the direct current motor will also vary appreciably and cause undesirable fluctuations in both the voltage and frequency of the output of the alternating current generator. Moreover, additional regulation must be provided so that the fluctuations of the direct current supply do not cause appreciable current fluctuation in the field exciting windings of the generator. Similar regulation problems are encountered in certain shipboard direct current to alternating current motor-generator sets.

It is an object, therefore, of this invention to provide improved dynamoelectric apparatus for converting direct current to alternating current.

Another object of this invention is to provide improved dynamoelectric apparatus for converting variable voltage direct current to alternating current having constant voltage and constant frequency.

A further object of this invention is to provide an improved system for exciting and regulating two direct-coupled dynamoelectric machines.

Still a further object of this invention is to provide a rugged, inexpensive system with no moving parts for regulating two direct-coupled dynamoelectric machines.

In a preferred embodiment of this invention, the dynamoelectric apparatus for converting variable voltage direct current to constant voltage, constant frequency alternating current comprises a direct current motor and an alternating current generator adapted to be driven thereby. A field exciting winding of the motor is energized in series circuit with a plurality of parallel circuits, one of which includes a field exciting winding of the generator and the other of which includes a non-linear resistor having a negative voltage-resistance characteristic, the energization of the entire circuit being in accordance with the supply voltage. The non-linear resistor, by changing its resistance inversely in accordance with the supply voltage, brings about a disproportionate change in the motor and generator field strengths upon variations in the supply voltage so as to hold the motor speed and generator output voltage essentially constant. To aid in keeping the generator output voltage constant, the generator has another field exciting winding connected to be energized in accordance with the armature current drawn by the motor.

For a better and more complete understanding of this invention, together with additional objects and advantages thereof, reference should now be had to the following description and accompanying drawing, which is a schematic diagram of a circuit embodying this invention for exciting and regulating two direct-coupled dynamo-electric machines.

Referring to the drawing, in a preferred embodiment of this invention a direct current motor 1 is mechanically coupled to drive an alternating current generator 2. Motor 1 has a main field exciting winding 3 and a light cumulative field exciting winding 4. By cumulative it is meant that when windings 3 and 4 are excited, winding 4 aids winding 3 in producing magnetic field flux. Winding 4 is employed primarily to obtain good starting characteristics for motor 1 and is not essential to the invention. If the starting characteristics of motor 1 are not very important to the application in which the motor generator set is to be used, winding 4 may be omitted. Generator 2 also has a main field exciting winding 5 and a cumulative field exciting winding 6.

Winding 6 and winding 4, if it is used, are serially connected with the armature of motor 1 across a source 7 of variable voltage direct current power. Windings 3 and 5 are also connected to be energized from source 7. Winding 5 is connected in series circuit with a linear resistor 8 to comprise one branch of a parallel circuit, the other branch of which includes a linear resistor 9 and a non-linear resistor 10. By linear resistor, it is meant an ordinary resistor whose resistance remains constant no matter what voltage is applied across it. Non-linear resistor 10, however, has a negative voltage-resistance characteristic which will be more fully described hereinafter. The parallel circuit including winding 5, resistors 8 and 9, and non-linear resistor 10 is connected serially with motor field winding 3 and a linear resistor 11 across power supply 7. An alternating current load 12 is connected to be energized from generator 2.

As mentioned above, non-linear resistor 10 has a negative voltage resistance characteristic. By negative voltage resistance characteristic, it is meant that resistor 10 has the property of reducing its resistance with an increase in voltage applied thereto. While this invention is not limited to any particular type of negative voltage-resistance characteristic resistance device, at present the preferred non-linear resistor is one constructed of the special ceramic resistance material, commonly known as "Thyrite," disclosed and claimed in Patent No. 1,822,744, granted September 8, 1931 to K. D. McEachron. This material has the property of substantially and instantaneously reducing its electrical resistance with increases in voltage across it.

In operation, the field excitations of motor 1 and generator 2 are automatically regulated so that generator 2 produces an essentially constant voltage, constant frequency, alternating current output under wide variations of the voltage of source 7 and of the demand of load 12. It has been found that the best results are obtained when generator 2 is designed with a high degree of saturation and motor 1 with a low degree. Assuming the voltage of source 7 to be at a given value and that the circuits involving windings 3 and 4 are adjusted so that the speed of motor 1 and thus the frequency of generator 2 is at a desired value, and further assuming that the circuits involving windings 5 and 6 are adjusted so that the output voltage of generator 2 is of the desired magnitude, the frequency and output voltage of generator 2 are maintained constant by the following action of the circuit.

If the voltage of source 7 should rise, motor 1 would normally have a tendency to increase its speed, since in any direct current motor of normal design, an increase in the total exciting ampere turns merely proportional to the supply voltage is not sufficient to maintain motor speed unchanged, due to saturation effects and the fact that armature IR drop is not negligible. However, as the applied voltage rises, the voltage across non-linear resistor 10 increases. This causes the resistance of resistor 10 to drop and results in an increased current flow through winding 3 over that which would flow if resistor 10 were a linear resistor. The increase in field excitation caused by the increased current through winding 3 is more than proportional to the increase in voltage across the armature of motor 1. Motor 1, therefore, does not speed up but continues to run at the normal given speed.

Since in direct current circuits, power equals voltage times current and the power demanded by load 12 is unchanged if the output frequency and voltage remain the same, the steady state armature current of motor 1 and, thus, the current in winding 4, if used, decreases as applied voltage increases. Although the decrease in armature current results in a smaller field excitation from winding 4, the increase in field excitation from winding 3 compensates for this as well as for the increase in armature voltage.

Not only the speed of motor 1 remains essentially constant on a rise in the voltage of source 7; the output voltage of generator 2 also remains constant. The percentage of the current through winding 3 also flowing through winding 5 decreases due to the decreased resistance of resistor 10. However, the current through winding 3 increases sufficiently, because of both the increased supply voltage and the drop in resistance of resistor 10, that the actual current through winding 5 may also increase. In other words, the increase in actual current through winding 3 overbalances the drop in the percentage thereof flowing through winding 5 so that the actual current in winding 5 tends to increase. The resultant increase in the field strength of winding 5 tends to result in an overall increased field strength for generator 2. That tendency, however, is opposed by a decrease in the field strength from winding 6, due to the previously mentioned decrease in motor armature current through winding 6. The increase in excitation from winding 5 counterbalances the decrease in excitation from winding 6 so that the over-all field excitation, and, thus the output voltage of generator 2, remains essentially constant.

If the voltage of source 7 should fall, the reverse procedure of what is described above occurs. Motor 1 normally would have a tendency to decrease in speed. The decrease in applied voltage, however, causes non-linear resistance 10 to increase its resistance so that the decrease in current flowing through winding 3 is more than proportional to the decrease in applied voltage. The accompanying disproportionate decrease in field excitation allows motor 1 to maintain speed at the given value rather than to decrease therefrom. Since with the same power output, the motor armature current, and thus the current through winding 4, if used, increases slightly, winding 3 also counteracts the resultant increase of field excitation from winding 4.

The output voltage of generator 2 also remains constant upon a decrease in voltage of source 7. The percentage of the current through the winding 3 also flowing through winding 5 increases, due to the increased resistance of resistor 10. However, the decrease in current in winding 3 tends to cause a decrease in the actual current through winding 5. The decreased field excitation from winding 5 is counteracted by an increased field excitation from winding 6, due to the increase in armature current described above, so that the amplitude of the output voltage of generator 2 remains essentially constant.

The output voltage and frequency of generator 2 likewise remain constant under fluctuations of the demand from load 12. The output voltage of generator 2 is held constant upon an increase in load by the action of winding 6 in adding to the field provided by winding 5, as is well known in the art. Since winding 6 is in the armature circuit of motor 1 and changes in load are reflected by the armature current of motor 1, the load changes cause corresponding changes in the field excitation of winding 6. These changes in field excitation of winding 6 balance the effect that the various load currents of generator 2 have in weakening the field therein and so maintain a constant output voltage from generator 2.

If motor 1 is properly designed with a low degree of saturation, load fluctuations do not cause objectional variations in motor speed and consequently in output frequency. When winding 4 is employed, the proper speed regulation may be obtained by shifting the motor brushes slightly once the motor has come up to speed.

Linear resistors 8, 9 and 11 are placed in the circuit so that various adjustments of frequency and of voltage may be obtained. In applications where only one output voltage at a single frequency is desired, the linear resistors can be omitted completely by proper design of windings 3 and 5 in association with non-linear resistor 10.

While what has been described is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What we claim as new and desire to secure by Letters Patent of the United States is:

1. In combination a direct current motor having an armature and a field exciting winding; an alternating current generator adapted to be driven by said motor and having a first field exciting winding and a second field exciting winding; a non-linear resistor having a negative voltage-resistance characteristic; means including connections for energizing said motor armature; means including connections for energizing said first generator field winding in accordance with the current in said armature; a plurality of parallel circuits one of which includes said second generator field winding and the other of which includes a said non-linear resistor; and means including connections for energizing said motor field winding in series circuit with said plurality of parallel circuits.

2. In combination a direct current motor having an armature, a first field exciting winding and a second field exciting winding; an alternating current generator adapted to be driven by said motor and having a first field exciting winding and a second field exciting winding; a non-linear resistor having a negative voltage-resistance characteristic; means including connections for energizing said motor armature in series circuit with said first motor field winding and said first generator field winding; a plurality of parallel circuits one of which includes said second generator field winding and the other of which includes said non-linear resistor; and means including connections for energizing said second motor field winding in series circuit with said plurality of parallel circuits.

3. In combination a direct current motor having an armature, a first flield exciting winding and a cumulative field exciting winding; an alternating current generator adapted to be driven by said motor and having a first field exciting winding and a cumulative field exciting winding; a non-linear resistor having a negative voltage-resistance characteristic; a first linear resistor, a second linear resistor, and a third linear resistor; means including connections for energizing said motor armature in series circuit with said cumulative motor field winding and said cumulative generator field winding; a plurality of parallel circuits one of which includes said first generator field exciting winding and said second linear resistor serially connected and the other of which includes said non-linear resistor and said third linear resistor serially connected; and means including connections for energizing said first motor field winding in series circuit with said first linear resistor and said plurality of parallel circuits.

PAUL LEBENBAUM, JR.
ALEC FISHER.

No references cited.